(12) United States Patent
Ward et al.

(10) Patent No.: US 7,011,227 B2
(45) Date of Patent: Mar. 14, 2006

(54) CONTAINER CAP WITH FINGER-OPENABLE, RECLOSABLE CLOSURE

(75) Inventors: Evan T. Ward, Chicago, IL (US); Donald J. Nole, Chicago, IL (US)

(73) Assignee: Ignite Design, LLC, Chicago, IL (US)

( * ) Notice: Subject to any disclaimer, the term of this patent is extended or adjusted under 35 U.S.C. 154(b) by 35 days.

(21) Appl. No.: 10/652,321

(22) Filed: Aug. 29, 2003

(65) Prior Publication Data

US 2005/0045634 A1 Mar. 3, 2005

(51) Int. Cl.
B65D 51/18 (2006.01)
A47G 19/22 (2006.01)

(52) U.S. Cl. .............................. 220/254.3; 220/354.7; 220/713; 220/715; 220/367.1; 220/817; 220/819; 220/844

(58) Field of Classification Search ............ 220/254.3, 220/254.5, 254.7, 713, 715, 716, 717, 367.1, 220/817, 819, 827, 830, 833, 843, 844; 222/556
See application file for complete search history.

(56) References Cited

U.S. PATENT DOCUMENTS

| | | | |
|---|---|---|---|
| 3,049,264 A * | 8/1962 | Morawski | 220/833 |
| D204,574 S | 4/1966 | Harvey et al. | |
| 3,281,024 A | 10/1966 | Henchert et al. | |
| 3,952,911 A | 4/1976 | Bozek et al. | |
| 4,441,637 A | 4/1984 | Libit | |
| 4,516,689 A | 5/1985 | Barker | |
| 4,582,216 A | 4/1986 | Byrd | |
| 4,629,088 A | 12/1986 | Durgin | |
| 4,821,899 A * | 4/1989 | Nycz et al. | 215/235 |
| 5,203,467 A * | 4/1993 | Tucker | 220/254.3 |
| 5,242,079 A | 9/1993 | Stephens et al. | |
| 5,244,113 A * | 9/1993 | Stymiest | 220/710.5 |
| 5,402,904 A | 4/1995 | Close | |
| 5,456,380 A | 10/1995 | Ito et al. | |
| 5,647,500 A | 7/1997 | Konno et al. | |
| 6,158,632 A | 12/2000 | Ekkert | |
| 6,783,019 B1 * | 8/2004 | Zettle et al. | 220/254.3 |
| 2003/0098306 A1 | 5/2003 | Cho | |

* cited by examiner

Primary Examiner—Robin Hylton
(74) Attorney, Agent, or Firm—Olson & Hierl, Ltd.

(57) ABSTRACT

A removable and reusable cap for a container is provided. The cap has a platform portion and peripherally associated upstanding and downwardly extending portions, and a depression is defined across the platform portion. In the depression, a dispensing aperture and preferably a vent are defined which are opened and closed by a closure plate that is received within the depression and that has a proximal end which is pivotably associated with the depression. The distal end of the closure plate is pivotally associated with a pull ring that is biased into association with the closure plate and that is nestably received in the closure plate, but that has a finger associatable apex region. When the pull ring is pivoted upwardly, the closure plate is pivoted and the dispensing aperture and vent are opened, preferably the vent before the dispensing aperture.

20 Claims, 3 Drawing Sheets

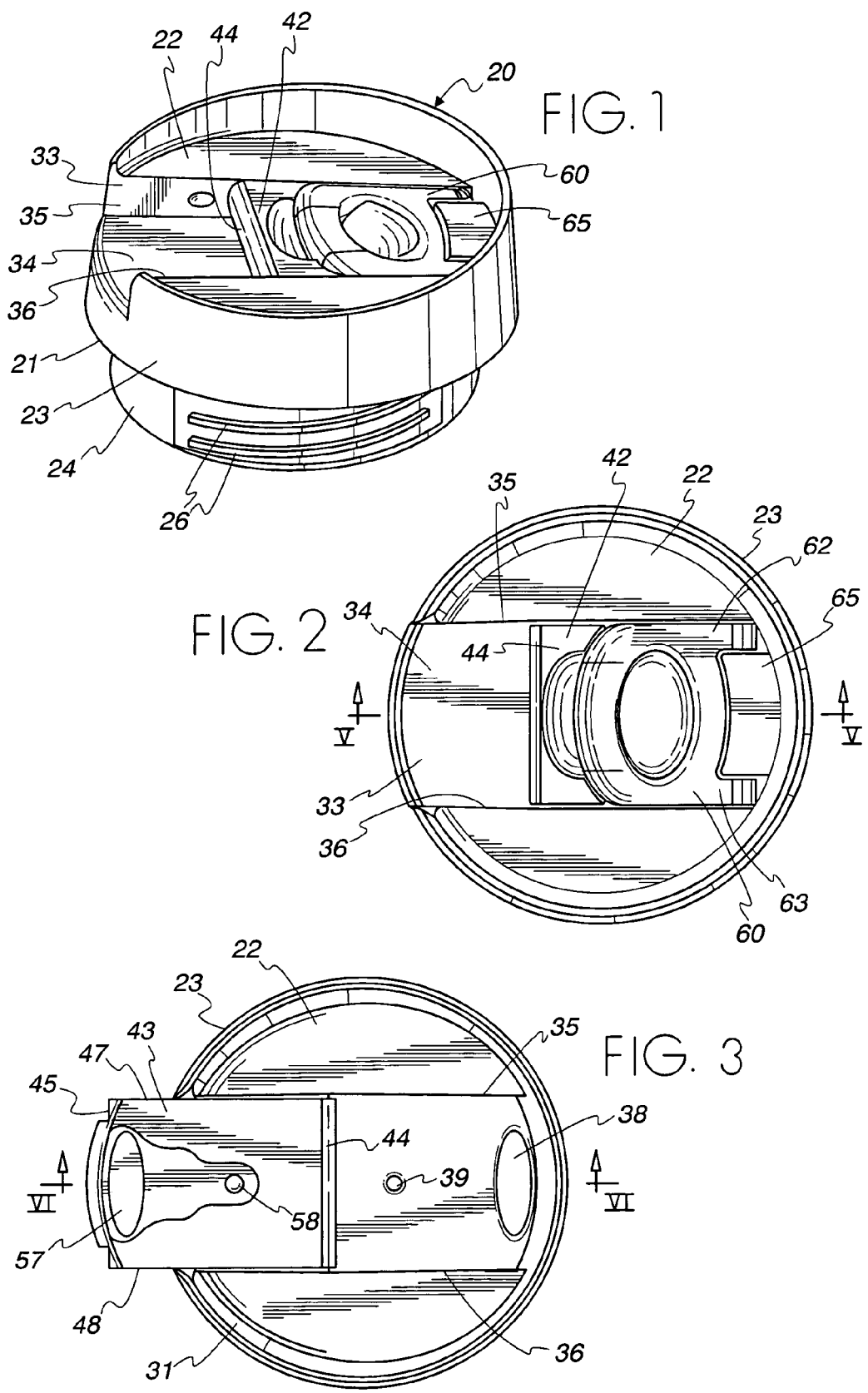

CONTAINER CAP WITH FINGER-OPENABLE, RECLOSABLE CLOSURE

FIELD OF THE INVENTION

The present invention relates to container caps, and more particularly to removable and reusable container caps having a dispensing aperture associated with a finger-openable, reclosable closure.

BACKGROUND OF THE INVENTION

Containers, in particular relatively small hand-held beverage containers, have come into wide-spread use. The fabrication of single use, disposable containers and lids presents different problems compared to the fabrication of reusable containers and lids suitable for indefinite reuse with repeated cycles of use, washing, drying (at least of exterior surfaces) and refilling. In such containers, typically the cap (or lid) has a cylindrical rim portion that is threadably engageable with a corresponding lip portion located about a mouth at one end of a container. To open and remove the cap from the container mouth, or to engage the cap with the container mouth and thereby close the container, two hands are necessary, with one hand grasping the container and the other the cap.

In many situations, it is not practical or safe to commit both hands of a user to opening and/or closing a cap relative to a container (for example, while driving an automobile). Thus, it would be desirable to have a reusable container and coacting removable cap combination where the cap is provided with a liquid dispensing aperture that is openable and closable, if desired, using only one hand without affecting the closed relationship of the cap relative to the container. Thereby, the user's other hand is free for other operations.

Although various container cap structures have previously been proposed that include both a dispensing aperture and a closure mechanism for opening and closing of the dispensing aperture, such prior art structures typically have components and features that are cumbersome or difficult to use and really require more than one hand for safe operation or use of the closure mechanism. Also, such prior art structures typically are not well adapted for indefinite reuse cycles. Typically, prior art structures have closure mechanisms that may interfere with use of the dispensing aperture.

The present invention aims to provide an improved reusable container cap for a container. The cap has an aperture that is associated with a closure mechanism that is easily openable and reclosable using, if desired, only a finger of one hand.

SUMMARY OF THE INVENTION

More particularly, this invention relates to a reusable cap for a container. The cap incorporates a dispensing aperture with an associated openable and reclosable closure mechanism that can be easily operated.

The cap has a preferably unitarily formed base structure that incorporates a transversely extending platform portion and also peripheral (relative to the platform portion), generally cylindrically extending portions. One peripheral portion provides an upper upstanding side wall that extends about regions of the platform portion while another peripheral portion provides a lower downwardly extending side wall that has thread means defined thereon for threadable association with lip portions of a container mouth. In the alternative, the cap can be press-fit or clamped relative to the container mouth. The platform portion preferably is generally inclined somewhat relative to the cylindrically extending portions so that a well is defined in one side region of the upper base structure by adjacent surface regions of the platform portion and the upstanding side wall.

The platform portion has a depression defined therein that extends generally transversely across the platform upper surface portion from the side region where the well is defined to an opposite side region thereof where the upper side wall portions define a discontinuity. The depression has a bottom and opposed side walls.

The bottom of the depression has a dispensing aperture defined therein that is located in spaced, adjacent, radially interior relationship relative to the cylindrical, downwardly extending side wall portions. Preferably a vent is also defined in the depression bottom, the vent being located in radially inwardly spaced relationship relative to the dispensing aperture.

The cap also has a closure plate which fits into the depression and which has upper and lower generally opposed surface portions, proximal and distal opposite end portions, and opposite lateral side portions. Preferably, each lateral side portion is adapted to fit adjacent to a different opposed side wall of the depression. The closure plate at its proximal end portions is associated with hinge means that is also associated with the depression so that the distal end of the closure plate is enabled to pivot from one end region of the depression to an opposite end region thereof. Closure plate lower surface portions adjacent to the distal end portions thereof are provided with stopper means positioned and adapted for closing the dispensing aperture, and also, if the vent is present, with smaller stopper means for closing the vent, when the lower surface portions lie adjacent bottom surface portions of the depression.

Distal end portions of the closure plate are pivotably associated by hinge means with a pull ring. When the pull ring is engaged with a finger and raised, the closure plate is pivoted upwardly from the depression bottom and the aperture is separated from its stopper. If the vent is present, the smaller vent stopper is separated from the vent preferably before the aperture stopper is separated from the aperture which is desirable for equalizing any pressure differential between the environment and the container interior before liquid is dispensed through the aperture.

Preferably the pivotable pull ring is associated with spring means so that the pull ring is pivotally urged into a flattened orientation against adjacent upper surface portions of the closure plate. Preferably the adjacent upper surface portions of the closure plate have indentations defined therein that are adapted to receive nestingly adjacent portions of the pull ring, and preferably, in the apex region of the pull ring, these indentations are enlarged and adapted to receive a user's finger so that the finger can be extended under the pull ring apex region to engage the pull ring in preparation for pivoting and raising the closure plate. Preferably the interrelationship between the pull ring and the closure plate is such that, when the closure plate is pivoted to an extent such that the upper surface portions of the closure plate are adjacent to the depression bottom, the pull ring can be located either therebetween, or can extend downwardly along adjacent side portions of an associated container. Preferably, when the closure plate upper surface portions are adjacent to the depression bottom, distal end portions of the closure plate protrude radially outwardly through the discontinuity in the upper side walls, whereby the closure plate distal end portions can be engaged by a finger and pivoted upwardly so that the aperture and the vent, if present, can be closed by the closure plate when the closure plate lower surface portions of the closure plate are again adjacent to the depression bottom.

The cap is conveniently fabricated, suitable for indefinite reuse, durable, reliable, safe, and overcomes disadvantages associated with prior art apertured container caps with reclosable aperture closures.

Other and further objects, aims, purposes, features, advantages, embodiments, variations and the like will be apparent from the teachings of the present specification taken with the accompanying drawings and the appended claims.

BRIEF DESCRIPTION OF THE DRAWINGS

In the drawings:

FIG. 1 is a perspective view of a presently preferred embodiment of the inventive cap showing the closure mechanism in a closed position;

FIG. 2 is a top plan view of the cap of FIG. 1;

FIG. 3 is a top plan view of the cap of FIG. 1, but showing the closure mechanism in a fully open position;

DETAILED DESCRIPTION

Figure 4:
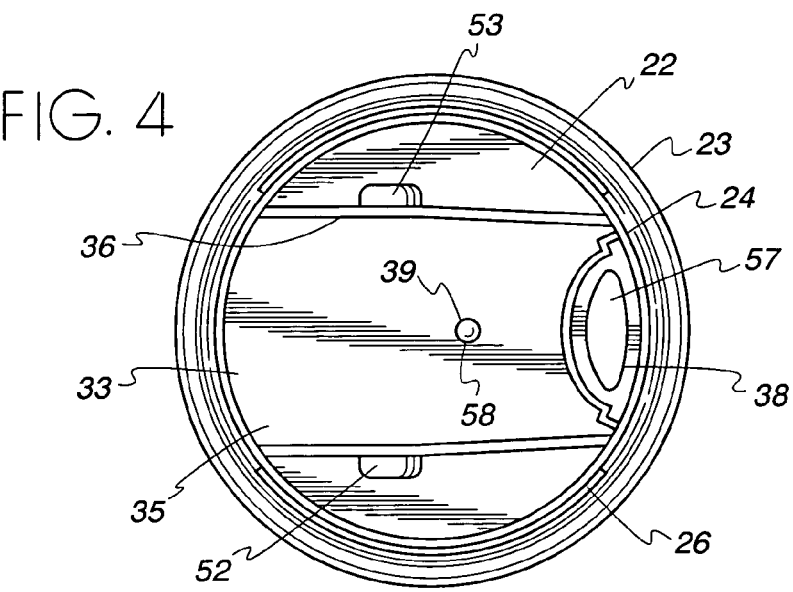
FIG. 4 is a bottom plan view of the cap of FIG. 1.
Figure 5:
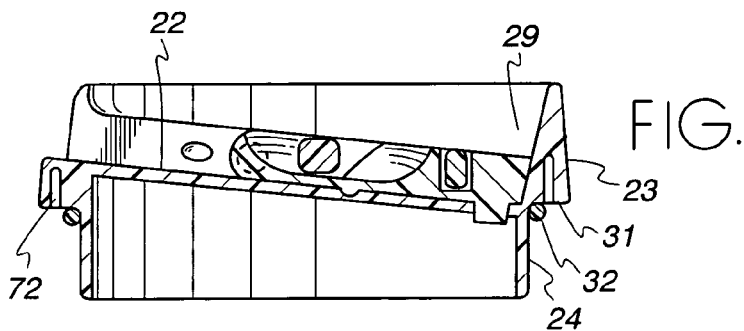
FIG. 5 is a vertical sectional view through the cap of FIG. 1 taken longitudinally and medially through the depression along the line V—V of FIG. 2.

Referring to the drawings, FIGS. 1–11 show an embodiment of a cap 20 of the invention. The cap 20 preferably comprises a unitarily formed base structure 21 formed conveniently of a molded plastic (preferred) or metal. The base structure 21 that includes a transversely extending platform portion 22 and also peripheral generally cylindrically extending regions that comprise upstanding side wall portions 23 and downwardly extending side wall portions 24. Thread members 26 are preferably formed (as shown) on outer cylindrical surface portions of the side wall portions 24. The side wall portions 24 preferably have a smaller outside diameter than the upstanding side wall portions 23. The side wall portions 24 are generally coaxial with the side wall portions 23.

For convenience in mating the cap 20 with lip portions 28 of a mouth 27 of a container 25, container threads (not detailed) can be provided which threadably and matingly engage the thread members 26. To facilitate ease in molding or a capacity for quick release of cap 20 from a container 25 with little twisting of cap 20, as those skilled in the art will appreciate, the thread members 26 are circumferentially discontinuous. Here, the threads 26 are illustratively formed as two sets, each set being on an opposed side region of the side wall portions 24. In the alternative, the cap 20 can be press-fit or clamped into or over the mouth 27 of the container 25. The outside surface portions of side wall portions 23 are here preferably tapered (as shown) and thus increase in thickness proceeding downwardly so that a generally radially flattened, circumferentially extending plateau area 31 is defined between the lower edge of the upper side wall portions 23 and the upper edge of the lower side wall portions 24. The radial thickness of plateau area 31 is preferably chosen to correspond to the radial thickness of the container 25 in the region of the mouth 27. An O-ring 32 that circumferentially extends around the upper edge of the lower side wall portions 24 adjacent to the plateau 31 is provided to enhance the achievement of a seal between the cap 20 and the container 25 when the threads 26 are engaged with the container 25. When the cap 20 is threadably engaged with a container 25, the adjacent side wall portions of the container 25 are preferably generally aligned with the side wall portions 23.

The platform portion 22 is preferably generally inclined somewhat relative to a preferably common axis (not marked) of the side wall portions 23 and 24. Thus, in effect, a well region 29 is defined adjacent a side edge of platform portion 22 between adjacent cylindrically extending interior surface regions of the side wall 23 and intersecting upper surface regions of the platform portion 22. Preferably, as shown, the upper outer edge portions of the side wall 23 define a hypothetical transversely extending plane that extends perpendicularly relative to the side wall 23 axis so that the height of the side wall 23 relative to the platform portion 22 is greatest in the bottom of the well region 29.

The platform portion 22 has a transversely relatively broad depression 33 relative to the upper surface of the platform portion 22 defined therein that extends generally diametrically across the platform portion 22 from one opposite side thereof to another. The depression 33 can be considered to begin in the bottom of the well region 29 and to extend across to the opposite side of the platform portion 22 where the side wall 23 is discontinuous so that the depression 33 is open ended at that point. The depression 33 preferably has a flattened bottom 34 and opposed, spaced, parallel side walls 35, 36 that extend perpendicularly to the bottom 24. The platform portion 22 has spaced, generally parallel, flat, smooth, upper and lower surfaces so that the contour of the lower surface generally corresponds to that of the upper surface.

The bottom 34 of the depression 33 has a dispensing aperture 38 defined therein which is located in spaced, adjacent, radially interior relationship relative to the continuous cylindrical, downwardly extending, side wall 24 preferably in the bottom of the well region 29. Preferably, as shown, a small (relative to aperture 38) vent 39 is also defined in the bottom 34. The vent 39 is preferably located in radially inwardly spaced relationship relative to the aperture 38. Preferably, the aperture 38 and the vent 39 are medially located in the bottom 34 with the aperture 38 preferably (as shown) having an oval perimeter configuration for ease of passage of liquid therethrough during liquid dispensing from the interior of an associated container 25.

The cap 20 is provided with a closure plate 41 that generally fits into the depression 33. The closure plate 41 has upper and lower surface portions 42 and 43, respectively, proximal and distal opposite end portions 44 and 45, respectively, and opposite lateral side portions 47 and 48, respectively. Preferably, as shown, each lateral side portion 47, 48 of closure plate 41 is adapted to fit adjacent to a different respective opposite side wall 35, 36 of depression 33, respectively. The proximal end portion 44 of closure plate 41 is transversely rounded and is associated with hinge means whereby the distal end 45 of closure plate 41 is enabled to pivot about 180° through a semi-circular path from one end region of depression 33, where the bottom 34 is adjacent to the lower surface 41, to the opposite end region thereof where the bottom 34 is adjacent to the upper surface 42.

In cap 20, the hinge means is preferably provided by a pair of coaxially arranged, axially spaced pin members 49, 50 (see FIG. 9), each one of which extends outwardly in opposed relationship to the other from engaged relationship with closure plate 41 on a different respective opposed side 47, 48 at proximal end 44. The outwardly extending end portion of each pin member 49, 50 is received in a block 52, 53 that is defined in, and extends away from the back side of each respective side wall 35, 36, as illustrated, for example, in FIG. 4. The closure plate 41 is thus pivotable relative to the pins 49, 50. Preferably, the pivot axis of pins 49, 50 is radially displaced from the axis of side wall portions 23 and 24. Particularly for purposes of assembly, as those skilled in the art will appreciate, each pin 49, 50 may be preliminarily located in a channel 54 defined in each side wall 35, 36 of closure plate 41 together with an interiorly located biasing spring 56 that longitudinally outwardly urges each pin 49, 50 in each channel 54.

During assembly, each pin 49, 50 is longitudinally depressed against the bias of spring 56 into its associated channel 54, and, when each pin 49, 50 is aligned with a different block 52, 53, each pin 49, 50 moves under its bias from spring 56 into engagement with a respective block 52, 53. Alternative hinge means can be employed, if desired.

The lower surface 43 of the closure plate 41 is provided with a stopper member 57 that is positioned and adapted for closing the aperture 38 when the lower portion 43 is adjacent to the bottom 34. If the vent 39 is also present, the lower surface 43 of the closure plate 41 is also provided with another stopper member (or plug means) 58 which is preferably substantially smaller than the stopper 57 and which is adapted for closing the vent 39 the lower portion 43 is adjacent to the bottom 34. Conveniently, the stopper members 57 and 58 are each unitarily formed with lower surface 43. The location of the vent 39 relative to the aperture 38, and the configuration of the stopper member 58 relative to the stopper member 57, are preferably such that, when the closure plate 41 is pivoted upwards away from the bottom 34, the stopper member (or plug means) 58 is separated from the vent 39 before the stopper member 57 is separated from the aperture 38. Thereby, any pressure over atmospheric or environmental pressure that is present in the associated container 25 is released and equalized before liquid is dispensed though the aperture 38.

Distal end portion 45 of the aperture plate 41 is pivotably associated with a pull ring 60. The pull ring 60 can be variously comprised and configured, but, as shown, for example, in FIG. 9 and elsewhere, in the cap 20, the pull ring 60 is preferably comprised of a thyroidal configured body 61 having an apex region 60a and a generally opposed foot region 60b from which a pair of circumferentially spaced legs 62 and 63 extend in spaced, parallel relationship relative to each other. Though the foot of each leg 62 and 63 extends a channel 64, each channel 64 being coaxial relative to the other. The spacing between the legs 62 and 63 is such as to permit the legs 62, 63 to straddle opposing notches defined in opposite sides of a mounting platform 65 defined on upper surface 42 at the distal end 45 of the closure plate 41. Each opposing side of platform 65 is provided with a pin receiving channel 66, the channels 66 being coaxial relative to each other. Legs 62, 63 are located so that pin members 68 and 69 are extended through aligned respective channel pairs 66 and 64 to permit the pull ring 60 to pivot relative to the distal end 45. At least one of the pin members 68, 69 is associated with a torsion spring 70 so as to bias the pull ring 60 into an adjacent, flattened relationship with the upper surface 41 of the closure plate 41. The terminal outside portion of each foot of each leg 62, 63 is provided with an eccentric curvature configuration such that, when the pull ring 60 is pivoted relative to the distal end 45 to a location where the pull ring 60 extends approximately perpendicularly relative to the closure plate 41, the eccentric curvature of each leg 62, 63 causes each leg 62, 63 to engage an adjacent portion of the distal end 45, thereby to act as a stop that prevents further pivoting of the pull ring 60 relative to the closure plate 41.

Figure 11:
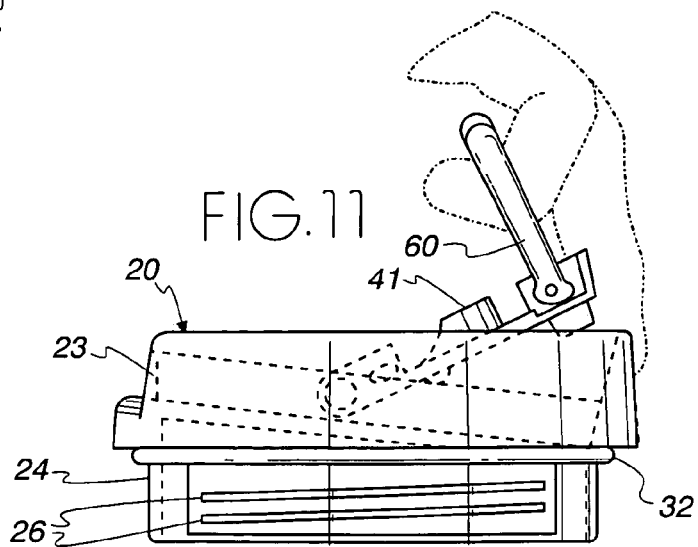
FIG. 11 is a partially diagrammatic, side elevational view of the cap of FIG. 1 showing the pull ring associated with a finger and elevated with the closure plate being pivoted upwardly to open the container aperture and vent, some parts thereof being shown in phantom.

Preferably, as shown, portions of the upper surface 41 that are adjacent to portions of the pull ring 60 when the pull ring 60 is adjacent to the upper surface 41 include indentations 59 that are adapted to receive nestingly the adjacent portions of the pull ring. Also, preferably adjacent to the apex region 60a of pull ring 60, the indentations 59 in the upper surface 41 are enlarged laterally and adapted to receive a user's finger. Thereby, the finger can be extended under and into a hook-like engagement with the apex region 60a, such as shown in FIG. 11, for purposes of pulling and pivotably raising the pull ring 60 relative to the closure plate 41, and hence pulling upwards the distal end of the closure plate 41 for pivoting the lower surface 43 of the closure plate 41 up and away from the bottom 34 and removing the stopper member 57 and, if present, stopper member 58 from the aperture 38 and, if present, the vent 39, thereby permitting a liquid to be dispensed from a container 25 associated with the cap 20.

Figure 6:
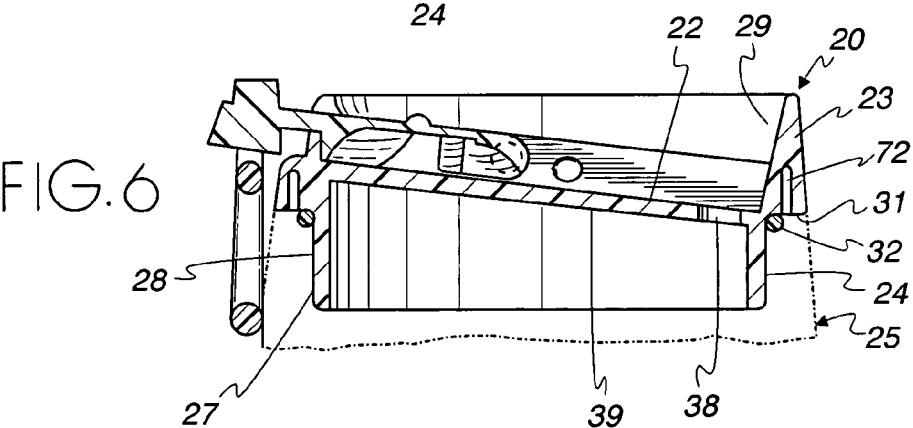
FIG. 6 is a view similar to FIG. 5, but showing the closure mechanism in a fully open position with the pull ring elevated and extending downwardly over and along adjacent side portions of a container associated with the cap, the container being fragmentarily shown in phantom, this view being taken along the line VI—VI of FIG. 3.

With the pull ring 60 elevated relative to the closure plate 41, the closure plate 41 can, if desired, be pivoted through about 180° so as to bring portions of the upper surface 42 into adjacent relationship with the bottom 34 with the distal portions of the closure plate 41 projecting radially outwardly beyond the platform portion 22 between the spaced, adjacent, discontinuous regions of the upstanding side wall portions 23. In this closure plate 41 position, the pull ring 60 can extend downwardly along side adjacent portions of the container 25, as illustrated in FIG. 6. Alternatively, and preferably, however, as the closure plate 41 is being pivoted relative to the pins 49, 50, and, perhaps, as a user who concurrently has a finger engaging the pull ring 60, concurrently pivots the pull ring relative to the pins 68, 69, the pull ring 60 can be released and allowed to be nestably received against the upper surface portions 42 of the closure plate 41. Then, as the pull ring 60 is further pivoted, upper surface portions 42 become located adjacent to the bottom 34 of depression 33 and the pull ring 60 is located therebetween, as illustrated, for example, in FIG. 10.

Figure 10:
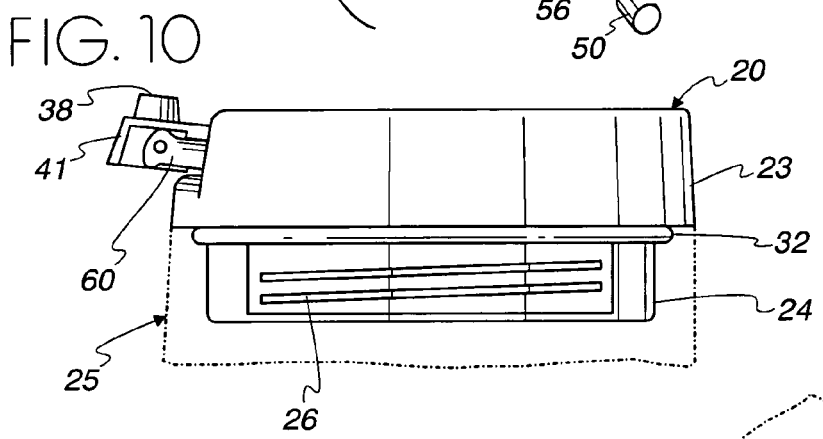
FIG. 10 is a side elevational view of the cap of FIG. 1 shown with the closure mechanism fully open as in FIG. 3 and the pull ring fully nested and retracted against the upper surface of the closure plate, and located between the upper surface of the closure plate and the bottom of the depression, a container associated with the cap being shown fragmentarily in phantom.

To close the aperture 38, and, if present, the vent 39, when the closure plate 41 is in a fully open position such as shown in FIG. 10 or FIG. 6, the finger of a user can be applied to the overhanging distal end 45 and employed to pivot the closure plate 41 back to the aperture 38 (and vent 39, if present) closed positions, as above described.

Figure 7:
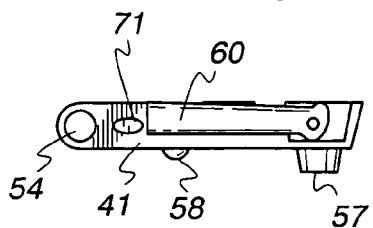
FIG. 7 is a side view of the closure plate and the pull ring shown apart from the cap of FIG. 1 with the pull ring nested against the closure plate.
Figure 8:
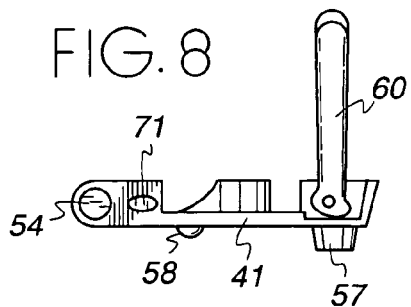
FIG. 8 is a side view similar to FIG. 7 but showing the pull ring pivoted to an upright position relative to the closure plate.
Figure 9:
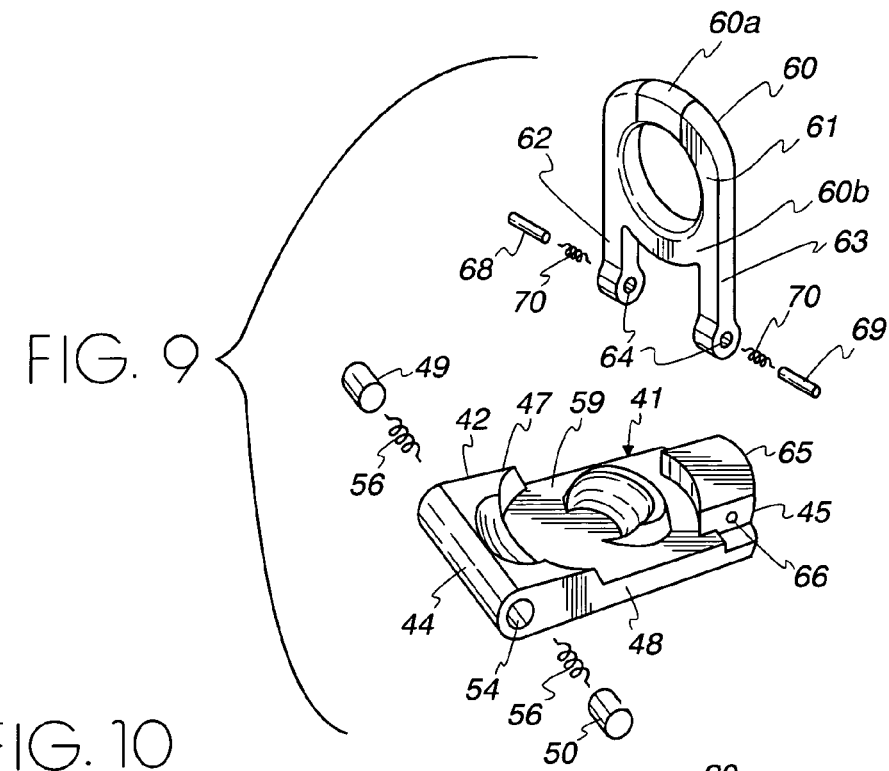
FIG. 9 is an exploded perspective view of the closure plate and the pull ring.

To retard pivoting of the closure plate 41 when either the lower surface 41 or the upper surface 42 is adjacent the bottom 34, retaining raised bumpers or protuberances 71 are preferably integrally formed on each of the lateral sides 47 and 48 of the closure plate 41, such as shown, for example, in FIG. 7. The elevation of a bumper 70 relative to a lateral side 47 or 48 is such that a bumper 71 has outer face portions which engage adjacent surfaces of side walls 35 or 36, as the case may be. The frictional engagement retards pivoting movement of the closure plate 41 which is generally desirable when the closure plate 41 is to retain the aperture 38 and, if present, the vent 39 in a stoppered condition without leakage, or when the closure plate 41 is to be retained in a fully open position, as above indicated.

It is presently preferred to have the side walls 35, 36 be slightly tapered on either side of a maximum depression width location at the position where the pins 49 and 50 associate therewith. Thus, the distance between the side walls 35, 36 slightly declines with increasing transverse distance from such position.

It is presently preferred to provide a circumferentially extending spacing slot 72 beginning in the plateau area 31 and extending upwardly into the upstanding side wall portions 23 in order to avoid heat sink and shrinkage problems from arising when the base structure 21 is molded.

As those both skilled and unskilled in the closure and cap arts will readily appreciate, numerous structural and functional modifications and adaptations may be made in the cap structure of the present invention without departing from the spirit and scope of the invention.

What is claimed is:

1. A cap for a container mouth comprising in combination:
   a transversely extending platform portion having upper and lower opposed faces and having a depression relative to said upper face defined therein that extends generally across said platform portion, said depression having a pair of laterally spaced, generally opposed side walls and a bottom wall extending between said side walls;
   a generally cylindrical, peripheral flange portion extending downwardly from said lower face, said flange portion defining circumferential surface portions whereby said flange portion is engageable with peripheral portions of said container mouth;
   a closure plate having top and bottom surface portions, proximal and distal opposite end portions, and a pair of laterally spaced, opposed lateral wall portions, said closure plate being generally receivable within and between said depression side walls with each of said lateral wall portions being adjacent to a different one of said side walls, said proximal end portion having first hinge means that pivotably associates said closure plate with said platform portion, whereby said closure plate is pivotable relative to said depression;
   said depression having an aperture defined therethrough that is located in spaced, adjacent, radially interior relationship relative to said flange, and said bottom surface portions of said closure plate having an outstanding stopper means associated therewith, the interrelationship between said aperture and said stopper means being such that, when said closure plate is pivoted so that said bottom surface portion is adjacent said depression bottom wall, said stopper means closes said aperture; and
   a pull ring pivotally connected to said distal end portion, including associated hinge means, whereby, when said pull ring is finger engaged, said closure plate is pivoted upwardly away from said depression and said stopper means is separated from said aperture.

2. The cap of claim 1 wherein a relatively small pressure equalizing vent hole is additionally defined in said depression in radially inwardly spaced relationship relative to said aperture, and said bottom surface portions additionally have an outstanding plug means associated therewith for closing said vent hole.

3. The cap of claim 2 wherein the interrelationship between said pressure equalizing hole and said plug means being such that, when said closure plate is pivoted so that said bottom surface portions are adjacent said depression, said plug means closes said pressure equalizing hole.

4. The cap of claim 3 wherein said stopper means has a depth substantially greater than the depth of said plug means whereby, when said pull ring is engaged by a finger, and said closure plate is pivoted upwardly away from said depression, said plug means is separated from said pressure equalizing hole before said stop-stopper means is separated from said aperture.

5. The cap of claim 1 wherein pull ring includes stop means limiting maximum pivotal movement of said pull ring relative to said closure plate.

6. The cap of claim 1 wherein each of said lateral wall portions has a raised protuberance that is adapted to frictionally and slidably engage an adjacent portion of each of said side walls when said closure plate is pivoted so that, when said closure plate is pivoted so that said bottom surface portions are adjacent said depression, said protuberances retard removal of said stopper means from said aperture.

7. The cap of claim 1 wherein said first hinge means comprises a pair of pin members each of which is associated with a different one of said lateral wall portions at said proximal end and also with an adjacent opposed portion of each of said side walls whereby said closure plate is pivotable relative to said depression.

8. The cap of claim 7 wherein the location where said pin members so associate with said side walls is such that, when said closure plate is pivoted about 180° from the location where said bottom surface portions of said closure plate are adjacent said depression and said stopper means closes said aperture, said distal end portions extend beyond said platform portion.

9. The cap of claim 7 wherein, after said 180° pivot, portions of said pull ring are located between said depression and said top surface portions.

10. The cap of claim 7 wherein, after said 180° pivot, portions of said pull ring extend downwardly from said closure plate outside of said platform portion.

11. The cap of claim 1 wherein said associated hinge means comprises a pair of pin members each of which is associated with a different one of said lateral wall portions at said distal end and also with an adjacent defined portion of said closure plate.

12. The cap of claim 11 wherein said pull ring includes a pair of rearwardly extending leg members each one of which is associated with one of said pin members whereby each said leg members is pivotably connected with a different opposite side of said distal end portion.

13. The cap of claim 12 wherein said upper surface portions have surface contours defined therein that are adapted to nestably receive portions of said pull ring but that leave an apex portion of said pull ring readily accessible for engagement with a finger.

14. The cap of claim 12 wherein said pull ring is additionally associated with spring means biasing said pull ring into a flattened position adjacent to said top surface portions.

15. The cap of claim 12 wherein a terminal portion of each said leg member is configured so that, when said pull ring is pivoted and elevated relative to said closure plate at an angle of about 90°, each said terminal portion engages an adjacent portion of said closure plate and thereby limits further movement of said pull ring.

16. The cap of claim 12 wherein said pull ring is comprised of a thyroidal configured body having an apex region and a generally opposed foot region from which a pair of circumferentially spaced legs extend in spaced, parallel relationship relative to each other, and the spacing between said legs is such that a portion of said closure plate at said distal end thereof fits therebetween, and each of said pin members extends between and associates with a different one of said spaced legs and an adjacent opposed portion of each of said side walls at said distal end whereby said pull ring is pivotable relative to said closure plate.

17. The cap of claim 16 wherein at least one of said spaced legs is associated with spring means for yieldingly biasing said pull ring into a flattened association with said closure plate.

18. The cap of claim 16 wherein portions of said closure plate that are located adjacent to portions of said pull ring are depressed and adapted to nestably receive said pull ring portions.

19. The cap of claim 16 where portions of said closure plate located adjacent to an apex region of said pull ring are depressed and adapted to receive a finger that is inserted under said apex region.

20. A reusable container cap for a container mouth comprising in combination:
a unitarily formed base comprising a transversely extending platform portion having a top surface, peripheral, upstanding side wall portions about said platform portion, and peripheral downturned, circumferentially extending, threaded side wall portions about said platform portion,
said platform portion being inclined relative to said side wall portions, thereby defining a well between said top surface and an adjacent region of said upstanding side wall portions, said platform portion also having a depression defined in said top surface that extends generally transversely thereacross from said well;
said depression having a bottom and opposed side walls, an aperture defined therein radially interiorly adjacent said downturned side wall portions and a vent defined therein in radially inwardly spaced relationship relative to said aperture;
a closure plate having upper and lower opposed surface portions, proximal and distal opposite end portions, and opposite lateral side portions which each fits in said depression adjacent a different one of said opposed side walls, said proximal end portions being associated with first hinge means enabling pivotal movements of said closure plate in said depression, and said lower surface portions having first and second stopper means positioned and adapted to close said aperture and said vent, respectively, when said lower surface portions are adjacent said bottom; and
a pull ring pivotally associated by second hinge means to said distal end portion and having spring means yieldingly biasing said pull ring into a flattened association with said upper surface portion and stop means limiting the maximum angle of pivotal opening of said pull ring relative to said closure plate;
said upper surface portion including depressed portions adapted to nestably receive adjacent portions of said pull ring and to permit access of a finger adjacent said pull ring;
whereby elevating said pull ring by said finger relative to said upper surface separates said lower surface portion from said bottom and opens said aperture and said vent.

\* \* \* \* \*